United States Patent
Qiao et al.

(10) Patent No.: US 10,698,914 B2
(45) Date of Patent: Jun. 30, 2020

(54) QUERY-BY-EXAMPLE FOR FINDING SIMILAR PEOPLE

(71) Applicant: Microsoft Technology Licensing, LLC, Redmond, WA (US)

(72) Inventors: Jian Qiao, Berkeley, CA (US); Shubha Umesh Nabar, Sunnyvale, CA (US); Daniel Tunkelang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 15/085,516

(22) Filed: Mar. 30, 2016

(65) Prior Publication Data

US 2016/0292238 A1 Oct. 6, 2016

Related U.S. Application Data

(60) Provisional application No. 62/140,818, filed on Mar. 31, 2015.

(51) Int. Cl.
*G06F 7/00* (2006.01)
*G06F 16/248* (2019.01)
(Continued)

(52) U.S. Cl.
CPC .......... *G06F 16/248* (2019.01); *G06F 16/242* (2019.01); *G06F 16/245* (2019.01);
(Continued)

(58) Field of Classification Search
CPC ......... G06F 17/30554; G06F 17/30424; G06F 9/4451; G06F 17/30699; G06F 17/30702;
(Continued)

(56) References Cited

U.S. PATENT DOCUMENTS 5,592,375 A * 1/1997 Salmon .............. G06Q 10/1053
705/22
6,308,175 B1 * 10/2001 Lang ................. G06F 17/30702
707/608

(Continued)

OTHER PUBLICATIONS

"Think Outside the Black. Box", LinkedIn.com, [Online]. Retrieved from the Internet: <URL: https://www.linkedin.com/pulse/20130618135158-50510-think-outside-the-black-box?trk=pulse-det-nav_art>, (Jul. 11, 2016), 2 pgs.

(Continued)

*Primary Examiner* — Mohammed R Uddin
(74) *Attorney, Agent, or Firm* — Schwegman Lundberg & Woessner, P.A.

(57) ABSTRACT

Techniques for determining an editable query which, when executed, identifies and presents a set of member profiles similar to a source member profile are described. In an embodiment, a preliminary set of member profiles similar to a source member profile is identified. A set of profile features is obtained from the preliminary set of similar member profiles, and a set of relevant profile features is extracted from the set of profile features. An editable query including the set of relevant profile features is presented. In an embodiment, the set of member profiles similar to the source member profile and corresponding to the set of relevant profile features is also presented. Upon having been edited, the editable query is executable to identify and present a new set of member profiles corresponding to the edited query.

23 Claims, 8 Drawing Sheets

(51) Int. Cl.
*G06F 16/245* (2019.01)
*G06Q 30/02* (2012.01)
*G06Q 10/10* (2012.01)
*H04L 12/58* (2006.01)
*G06F 16/242* (2019.01)
*G06Q 50/00* (2012.01)

(52) U.S. Cl.
CPC ......... *G06Q 10/10* (2013.01); *G06Q 30/0241* (2013.01); *H04L 51/00* (2013.01); *H04L 51/32* (2013.01); *G06Q 50/01* (2013.01)

(58) Field of Classification Search
CPC .... G06Q 10/10; G06Q 30/0241; G06Q 50/01; H04L 41/22
USPC ................................ 707/767, 733, 324, 759
See application file for complete search history.

(56) References Cited

U.S. PATENT DOCUMENTS

| | | | |
|---|---|---|---|
| 8,972,414 B2 | 3/2015 | Posse et al. | |
| 9,710,520 B2* | 7/2017 | Srivastava | G06F 17/3053 |
| 9,710,555 B2* | 7/2017 | Smith | G06F 17/30861 |
| 9,811,569 B2* | 11/2017 | Posse | G06F 17/3053 |
| 2003/0115193 A1* | 6/2003 | Okamoto | G06F 17/30702 |
| 2004/0030680 A1* | 2/2004 | Veit | G06F 17/30867 |
| 2006/0156326 A1* | 7/2006 | Goronzy | G06F 17/30035 725/13 |
| 2008/0140566 A1* | 6/2008 | Chowins | G06Q 20/10 705/39 |
| 2009/0063568 A1* | 3/2009 | Choe | G06F 17/30035 |
| 2009/0307168 A1* | 12/2009 | Bockius | G06F 17/30867 706/46 |
| 2010/0094863 A1* | 4/2010 | Kenton-Dau | G06Q 10/06375 707/722 |
| 2010/0131418 A1* | 5/2010 | McCagg | G06Q 10/00 705/321 |
| 2011/0106850 A1* | 5/2011 | Li | G06F 17/30699 707/780 |
| 2012/0117094 A1* | 5/2012 | Pratt | G06Q 10/06 707/758 |
| 2013/0031090 A1* | 1/2013 | Posse | G06F 17/30867 707/723 |
| 2013/0332451 A1* | 12/2013 | Camplejohn | G06F 17/30867 707/722 |
| 2014/0122472 A1* | 5/2014 | Wells | G06F 17/30864 707/732 |
| 2014/0245188 A1* | 8/2014 | Berger | H04L 65/403 715/753 |
| 2014/0278633 A1* | 9/2014 | Daly | G06Q 10/063112 705/7.14 |
| 2015/0127565 A1* | 5/2015 | Chevalier | G06Q 10/00 705/319 |
| 2015/0134633 A1* | 5/2015 | Colgrove | G06F 16/951 707/706 |
| 2016/0004778 A1* | 1/2016 | Finder | G06Q 50/01 707/722 |
| 2016/0132198 A1* | 5/2016 | Sinclair | G06F 3/0482 715/739 |
| 2016/0253428 A1* | 9/2016 | Hasan | G06F 17/30867 707/754 |
| 2017/0076243 A1* | 3/2017 | Noble | G06Q 10/063112 |

OTHER PUBLICATIONS

Zloof, Moshe M, "Abstract: Query-by-example: the invocation and definition of tables and forms", Proceedings of the 1st International Conference on Very Large Data Bases, [Online]. Retrieved from the Internet: <URL: http://dl.acm.org/citation.cfm?id=1282482>, (1975), 2 pgs.

* cited by examiner

*┌─600*

```
← → ⟳ ⌂ | http://www.thenet.com/profile~Joe_Hansen

PEOPLE
```

| | Joe Hansen<br>Software Engineer<br>San Francisco, CA \| Internet |
|---|---|
| Current | Zynga |
| Past | Electronic Arts |
| Education | Univ. of Illinois<br>BS Computer Science |
| Connections | 129 |
| Websites | www.joe-hansen.net |
| Twitter | Joe-twit |

SUGGEST PROFILE UPDATE FOR JOE
SEND JOE A MESSAGE
RECOMMEND JOE
SAVE JOE'S PROFILE
FIND SIMILAR PROFILES ——— 602

WHO HAS VIEWED THIS PROFILE?
8 People have viewed in 15 days
10 times this profile has been in search results JOE's ACTIVITY
Joe is now connected to Fred
Joe tweeted: Boarding a flight to NY...
Joe is reading: Successful Entrepreneurs in Silicon Valley

FIG. 6

QUERY-BY-EXAMPLE FOR FINDING SIMILAR PEOPLE

CLAIM OF PRIORITY

This patent application claims the benefit of priority to U.S. Provisional Patent Application Ser. No. 62/140,818, filed on Mar. 31, 2015, entitled, "QUERY-BY-EXAMPLE FOR FINDING SIMILAR PEOPLE," which is hereby incorporated by reference herein in its entirety.

TECHNICAL FIELD

The present disclosure generally relates to data processing systems, and specifically relates to providing a modifiable query to a user of an electronic social/business networking service; upon executing the query against the networking service, the query identifies one or more target member profiles that are similar to a source member profile.

BACKGROUND

A social networking service is a computer- or web-based application that enables users to establish links or connections with other people to share information with one another. Some social networks aim to enable friends and family to communicate with one another, while others are specifically directed to business users with a goal of enabling the sharing of business information. For purposes of the present disclosure, the terms "social network," "social networking service," "electronic social network" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information," and when shown collectively, it is commonly referred to as a member's profile. With certain social networking services, such as some business networking services, a member's personal information may include information commonly included in a professional resume or curriculum vitae, such as information about a person's education, employment history, skills, professional organizations, and so on.

BRIEF DESCRIPTION OF THE DRAWINGS

Some embodiments are illustrated by way of example and not limitation in the figures of the accompanying drawings.

FIG. 6 illustrates an example of a user interface for requesting a query to find target member profiles similar to a source member profile, according to an embodiment.

DETAILED DESCRIPTION

Figure 1:
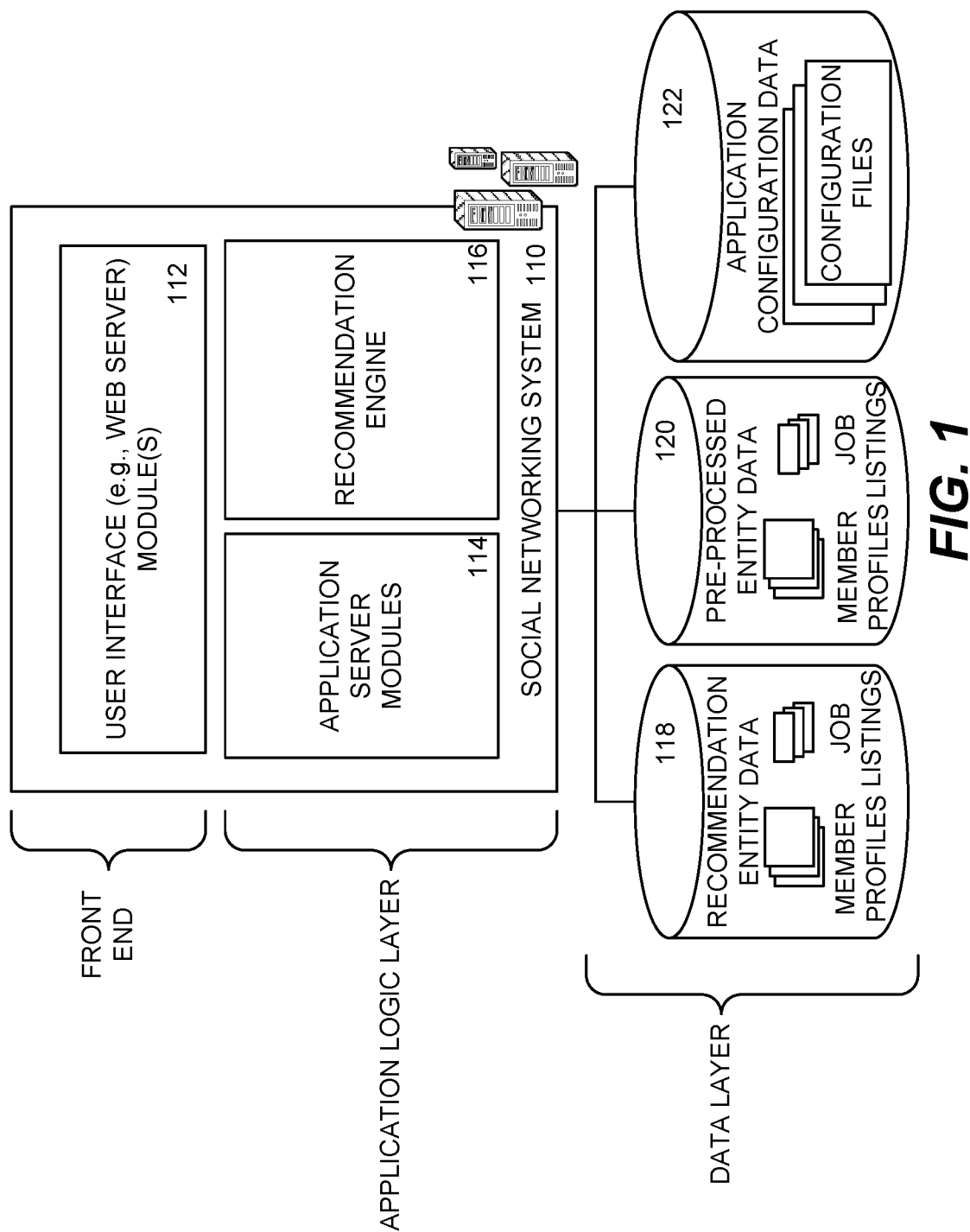
FIG. 1 is a block diagram illustrating various components of an online social networking service including a recommendation engine for identifying similarities between different recommendation entity types (e.g., such as member profiles, job listings, groups, advertisements, and so forth), according to an embodiment.

The present disclosure describes methods and systems for providing to a user of an online social networking service a modifiable query that may be used to identify target member profiles on the electronic social network that are similar to a source member profile on the electronic social network. In the following detailed description, for purposes of explanation, numerous specific details are set forth in order to provide a thorough understanding of the various aspects of the presently disclosed subject matter. However, it will be to those skilled in the art that the presently disclosed subject matter may be practiced without these specific details. In other instances, well-known methods, procedures, and components have not been described in detail so as not to obscure the presently disclosed subject matter.

For purposes of the present disclosure, the given member profile, which serves as input to a member profile matching algorithm or process, is referred to herein as a "source member profile." To distinguish from the source member profile, the member profiles that are determined to be similar to the source member profile are referred to herein as "target member profiles." Member profiles that are potentially target member profiles are referred to herein as "potential target member profiles."

Users of search engines spend most of their time either narrowing or broadening their searches. The process of narrowing—which begins as soon as a user begins to enter a search query—increases precision (e.g., eliminating irrelevant search results). Conversely, the process of broadening increases recall (e.g., capturing greater numbers of relevant search results). Because the goal of most search engines is to return the "best" answer as the top-ranked result, search engine developers tend, naturally, to focus on precision.

However, search quality involves more than just precision. A typical "exploratory search" strategy is to start from a single satisfactory search result, and then "widen the net" to find additional similar search results. Information scientists call this strategy "pearl growing."

Consider the mundane problem of purchasing headphones on Amazon.com. An initial search might result in displaying a product that has a high rating, but which is too expensive for the user. Anticipating this need, Amazon.com allows a user to "explore similar items." This feature uses "collaborative filtering": for a given item, presenting the user with other items viewed by the people who viewed the given item. The results of collaborative filtering may be reasonable, but there is no way to specify which aspects (e.g., sound quality, color, style, etc.) of the product are important to the user and which aspects are not. Instead, the user is relegated to relying on what the wisdom of crowds defines as similar.

Unfortunately, similarity is subjective; when similarity is regarded as a black box, that subjectivity is reduced to a popularity contest. Without explanations, the searcher does not understand why the search engine identifies certain results as similar and excludes other results as not sufficiently similar.

Even if searchers are willing to forgo explanations, similarity is a hard problem for machines and people alike. Determining a good generalization from a set of items is difficult, and especially difficult to do so from a single item.

Rather than present searchers with black box results, a better approach for a search engine is to provide a searcher a set of explainable generalizations and offer the searcher a choice among them. In other words, the search engine should request from the searcher those aspects of the current result that should be held constant and those that should be allowed to vary.

An approach to implement this idea is for the search engine to list the features (e.g., "facets") associated with a search result, and to allow the searcher to select (e.g., with a set of checkboxes) the facet(s) that is/are important. Some e-commerce sites have implemented this approach.

This approach is appealing and simple in concept. Unfortunately, this approach confronts a searcher with a combinatorial explosion of choices: the number of generalizations the checkboxes offer is literally exponential in the number of facets. Furthermore, many of the generalizations will not help the searcher; in fact, many of the generalizations may not even broaden the search beyond the initial result.

A better approach would be for the search engine to constrain and guide the generalization process intelligently. The search engine evaluates the exponential number of possible generalizations and identifies a subset to present to the searcher. Each of these generalizations should be useful (e.g., adding a significant number of additional results) and plausible (e.g., adding results that have some intuitive similarity to the initial results). If two generalizations are similar to one another, the search engine might present only the "better" generalization.

Online social networking services have typically provided their users the ability to search for people similar to a selected person by using recommender systems. For example, finding target member profiles similar to a source member profile is described in U.S. patent application Ser. No. 13/194,883, filed on Jul. 29, 2011 to Posse, et al. entitled, "METHODS AND SYSTEMS FOR IDENTIFYING SIMILAR PEOPLE VIA A BUSINESS NETWORKING SERVICE," (hereinafter "Posse"). Although useful, the search results produced by Posse are a black box inasmuch as the user is not informed how the search results are similar to the source member profile. Furthermore, although Posse allows a user to filter the search results (thereby increasing the precision of the search), Posse does not allow the user to expand the search results (thereby increasing the recall of the search) to include other potentially relevant profiles that were not included in the initial search results.

FIG. 1 is a block diagram illustrating various components of a social networking system 110 including a recommendation engine 112 for identifying similarities between different recommendation entity types (e.g., such as member profiles, job listings, groups, advertisements, and so forth), according to an embodiment. As shown in FIG. 1, the social networking system 110 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the disclosure with unnecessary detail, various functional modules and engines that are not germane to conveying an understanding of the disclosed subject matter have been omitted from FIG. 1. However, a skilled artisan will readily recognize that various additional functional modules and engines may be used with a social networking system such as that illustrated in FIG. 1, to facilitate additional functionality that is not specifically described herein. Furthermore, the various functional modules and engines depicted in FIG. 1 may reside on a single server computer or may be distributed across several server computers in various arrangements.

As shown in FIG. 1, the front end may consist of a user interface module (e.g., a web server) 112, which may receive requests from various client computing devices (not shown), and may communicate appropriate responses to the requesting client computing devices. The user interface module(s) 112 may receive requests in the form of Hypertext Transport Protocol (HTTP) requests, or other web-based, application programming interface (API) requests. The application logic layer may include various application server modules 114, which, in conjunction with the user interface module(s) 112, may generate various user interfaces (e.g., web pages) with data retrieved from various data sources in the data layer. Individual application server modules 114 may be used to implement the functionality associated with various services and features of the social networking service. For example, the ability to identify target member profiles similar to a source member profile—a service that may be recognized by the name, "People Like This" or "Profiles Similar to This"—may be a service implemented in an independent application server module 114. Similarly, other applications or services that utilize the recommendation engine 116 may be embodied in their own application server modules 114.

As shown in FIG. 1, the data layer includes several databases, such as a database 118 for storing recommendation entity data (e.g., member profiles, job listings, interest groups, companies, advertisements, events, news, discussions, tweets, questions and answers, etc.) The recommendation entity data may be processed in the background (e.g., offline) to generate pre-processed entity data that may be used by the recommendation engine, in real-time, to make recommendations generally, and specifically to identify target member profiles similar to a source member profile. In an example, the recommendation engine 116 retrieves and processes member profile data in the pre-processed entity data database 120 to identify target member profiles similar to a source member profile. The application configuration database 122 in FIG. 1 is shown as storing application configuration data, including one or more configuration files for use with the recommendation engine 116, as is described in greater detail in connection with the description of FIG. 2.

When a person initially registers to become a member of the social networking service, the person may be prompted to provide some personal information, such as his or her name, age (e.g., birthdate), gender, interests, contact information, home town, address, the names of the member's spouse and/or family members, educational background (e.g., schools, majors, etc.), employment history, skills, professional organizations, and so on. This information may be stored, for example, in recommendation entity database 118.

Once registered, a member may invite other members, or be invited by other members, to connect via the social networking service. A "connection" may require a bi-lateral agreement by the members, such that both members acknowledge the establishment of the connection. Similarly, a member may elect to "follow" another member. In contrast to establishing a "connection," the concept of "following" another member typically is a unilateral operation, and does not typically require acknowledgement or approval by the member that is to be followed. When one member follows another, the member who is following may receive automatic notifications about various activities undertaken by the member being followed.

The social networking service may provide a broad range of other applications and services that may allow members the opportunity to share and receive information, often customized to the interests of the member. For example, the social networking service may include a photo sharing application that allows members to upload and share photos with other members. In some instances, members are able to self-organize into groups, or interest groups, organized around a subject matter or topic of interest. With some social networking services, members are able to subscribe to or join groups affiliated with one or more companies. For example, a member of the social networking service may be able to indicate an affiliation with a company at which the member is employed, such that news and events pertaining to the company are automatically communicated to the member. In some instances, a member may be allowed to subscribe to receive information concerning companies other than the company, with which the member is employed. With many of these applications and services, one or more recommendation entities may be involved. For example, in addition to identifying target member profiles that are similar to a source member profile, the recommendation engine 116 may be configured and customized to identify groups, companies, or photos that are likely to be of interest to a particular member.

Figure 2:
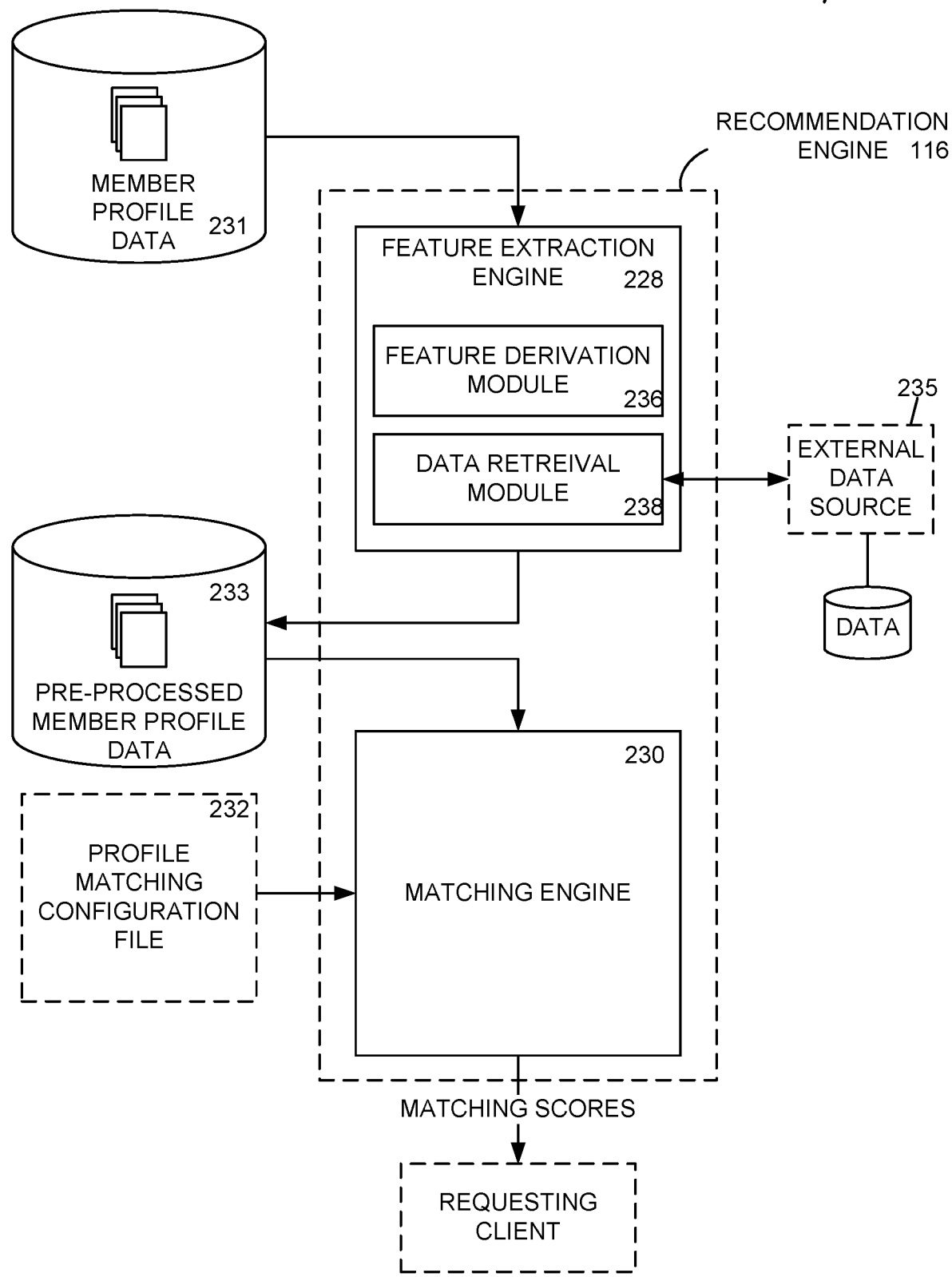
FIG. 2 is a block diagram illustrating some of the functional components or modules that comprise a recommendation engine and illustrating the flow of data that occurs when performing various operations to identify and present target member profiles that are similar to a source member profile, according to an embodiment.

FIG. 2 is a block diagram illustrating some of the functional components or modules that may comprise a recommendation engine 116 and illustrating the flow of data that occurs when performing various operations to identify and present target member profiles that are similar to a source member profile, according to an embodiment. As illustrated in FIG. 2, the recommendation engine 116 may consist of two primary functional modules—a feature extraction engine 228 and a matching engine 230. The recommendation engine 116 may be a general recommendation engine that may be configured and/or customized to identify similarities (or differences) between various entities other than member profiles. This may be achieved, in part, by customizing the feature extraction engine 228 to extract various features from various recommendation entities, and then operating the matching engine under the direction of a particular configuration file to perform a particular type of matching operation that is specific to the requesting application. Accordingly, depending upon the particular inputs to the recommendation engine 116 and the desired outputs, different configuration files may be used to compare different features of different recommendation entities. For example, to identify target member profiles that are similar to a source member profile, a particular configuration file (referred to herein as a profile matching configuration file 232) may optionally be used, while different configuration files may be used to perform other tasks, such as identify jobs in which a member may be interested, to identify other members that a member may know, etc.

To identify target member profiles similar to a source member profile, the profile matching configuration file 232 may optionally be used as an input to the matching engine 230 to specify the various member profile features that the matching engine is to extract from the pre-processed member profile data 233 and is to compare. The profile matching configuration file 232 may optionally be used to specify the algorithm for comparing profile features and generating an overall matching score.

Each member's profile data 231 may be provided as input to the feature extraction engine 228, processed by the feature extraction engine 228, and then output and stored as pre-processed member profile data 233. The feature extraction engine 228 may extract only relevant features from whatever recommendation entity is being processed by the feature extraction engine. Therefore, with some embodiments, in the case of the recommendation entity being a member profile, the feature extraction engine 228 may extract only the profile features that are necessary for making a determination of whether any two member profiles are similar. However, with some embodiments, all features are extracted, while only certain features are further processed or refined.

As shown in FIG. 2, the feature extraction engine 228 includes a feature derivation module 236 and a data retrieval module 238. The feature derivation module 236 may derive certain features (e.g., profile features) based on the data input to the feature extraction engine. For example, in the case of the recommendation entity being a member profile, the feature derivation module 236 may derive one or more profile features for a member profile from the information included in the member's profile, in another member's profile, or both. Similarly, the data retrieval module 238 may utilize information input to the feature extraction engine 228 to formulate a query that may be communicated to an external data source 235. As such, the data retrieval module 238 of the feature extraction engine may retrieve various profile features from one or more external data sources, such that these retrieved profile features may be used to determine the similarity of any two member profiles.

In addition to deriving various profile features and retrieving various profile features, the feature extraction engine 228 may include logic to normalize or standardize certain profile features. For example, a member may be prompted to provide his or her job title. Because job titles may vary from one company to another and from one industry to another, job titles may need to be normalized or standardized before they are useful in determining similarities between two member profiles. For example, the simple job title, "Analyst" will have very different meanings in different industries. By normalizing and/or standardizing the job titles and then writing the standardized and normalized job titles to each member's enhanced profile, the recommendation engine may perform more meaningful comparisons, and thereby may provide more accurate results when presenting target member profiles similar to a source member profile.

After the feature extraction engine 228 has generated the pre-processed member profile data 233, the matching engine 230 may be able to process client requests to identify target member profiles similar to a source member profile. The client of the matching engine 230 may simply be a serverside application that is requesting the information from the matching engine 230. Accordingly, the requesting application may specify or determine the particular configuration file that is to be used by the matching engine 230 to perform the requested task and achieve the requested objective. When a request is received at the matching engine 230 to provide a list of target member profiles similar to a source member profile, the matching engine 230 may optionally use the profile matching configuration file 232 to determine the particular member profile features that are to be retrieved from the various enhanced member profiles. The optional profile matching configuration file 232 may specify the comparisons that are to be performed and the process for calculating the overall matching score. Accordingly, the optional particular profile matching configuration file 232 may include instructions or directives for use by the matching engine 230 to perform the profile feature comparisons, and to generate the similarity scores for each member profile, such that the similarity score for a member profile indicates the similarity of that member profile with respect to the source member profile.

The matching engine 230 may compare multiple individual profile features, such that each compared profile feature results in a similarity score (referred to herein as a "sub-score," to reflect that the sub-score is a component of the overall similarity score). Upon each sub-score being determined, the sub-scores may be combined in a manner indicated by the optional profile matching configuration file 232. That is, the optional profile matching configuration file 232 may dictate how the matching engine 230 is to weigh and combine the individual similarity sub-scores to derive the overall similarity score for each member profile.

Figure 3:
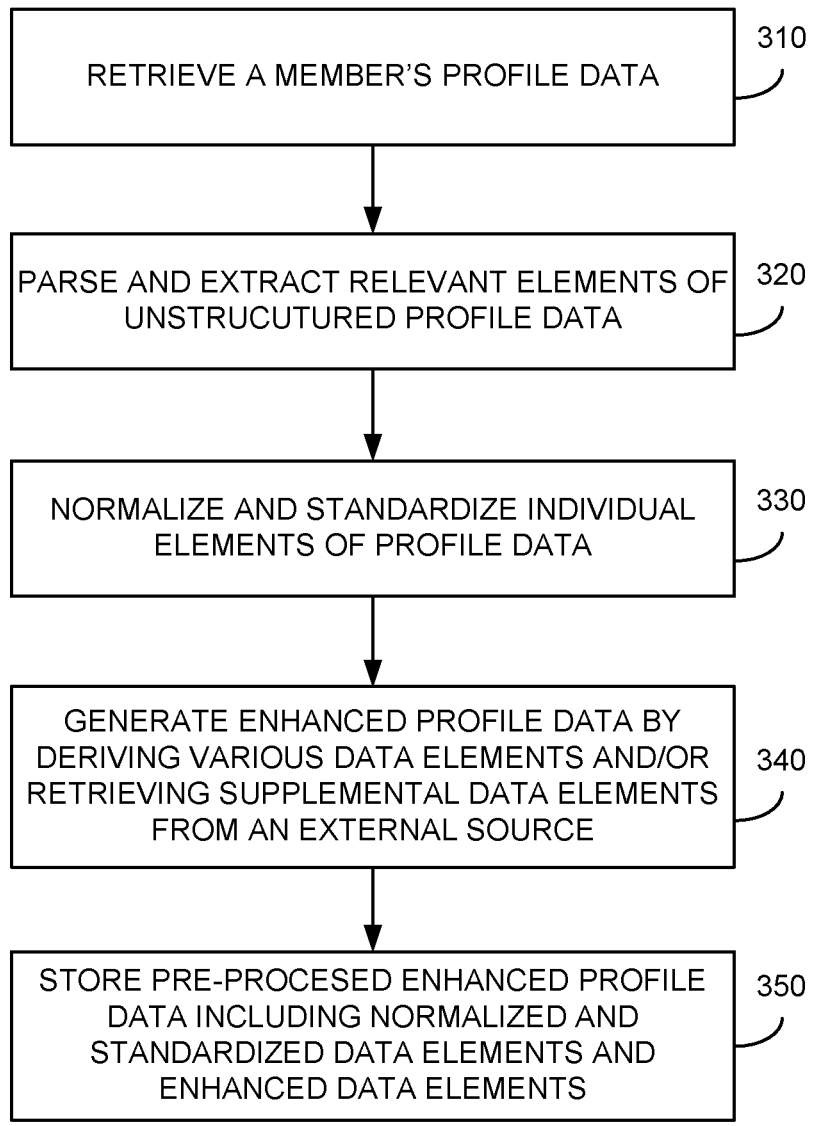
FIG. 3 is a flow diagram illustrating an example of the operations involved in a method of pre-processing member profiles with a feature extraction engine to generate enhanced profiles for use by a matching engine, according to an embodiment.

FIG. 3 is a flow diagram illustrating an example of the operations involved in a method 300 of pre-processing member profiles with a feature extraction engine to generate enhanced profiles for use by a matching engine, according to an embodiment. Although FIG. 3 provides an example method 300 for extracting features of a member profile for use by an algorithm for identifying similar member profiles, similar operations may be undertaken to extract other features of other recommendation entities, such as job listings, advertisements, companies or groups, and others. The operations illustrated in FIG. 3 may be performed offline by means of a batch process that is performed periodically (e.g., two times a day, daily, weekly, etc.), online and in real-time (or near real-time) as requests for similar member profiles are received and processed, or a combination thereof.

The method 300 begins when, at method operation 310, the profile features for a member profile are retrieved. The feature extraction engine may be configured to extract specified features from each member's profile information. Accordingly, the feature extraction engine may simply retrieve from a database the specified data corresponding to the specified profile features. The retrieval may be as simple as performing a database look-up or fetch of the specified data.

As some profile features may be free-form text (e.g., unstructured data), such as a description of a member's interest, skills, hobbies, career objectives, etc., at method operation 320, some of the relevant features that have been retrieved may be parsed and extracted from their raw data format. Next, at operation 330, one or more processes may be performed to either normalize or standardize one or more profile features. For example, a member's job title may be standardized so that it may be more easily compared with other job titles. Similarly, the name of a member's employer may be normalized, for example, to drop or add "Inc.," "Corporation," etc. One or more processes disclosed in Hardtke may be used to perform either the normalization or standardization.

At operation 340, the feature extraction engine may derive one or more profile features from raw data included in a member's profile. For example, one or more enhanced profile features may be features that may be derived from the raw data included in a member's profile. If, for example, a person's profile indicates the year that he or she graduated from college, an enhanced feature that may be derived from this raw data may include the number of years of the member's work experience after college. In addition, some profile features may include data received from a data source external to the social networking service. Accordingly, data from a member's profile (e.g., a name, or other identifying data) may be used to query an external data source for additional information about the member.

Finally, at method operation 350, the relevant profile features, including any extracted profile features, derived profile features, normalized or standardized profile features, or any retrieved profile features may be written to storage as a pre-processed, enhanced member profile. As described in connection with the description of FIG. 4, this pre-processed member profile data may be used by the matching engine to generate similarity scores for respective member profiles, and to identify the target member profiles that are the most similar to a source member profile.

Figure 4:
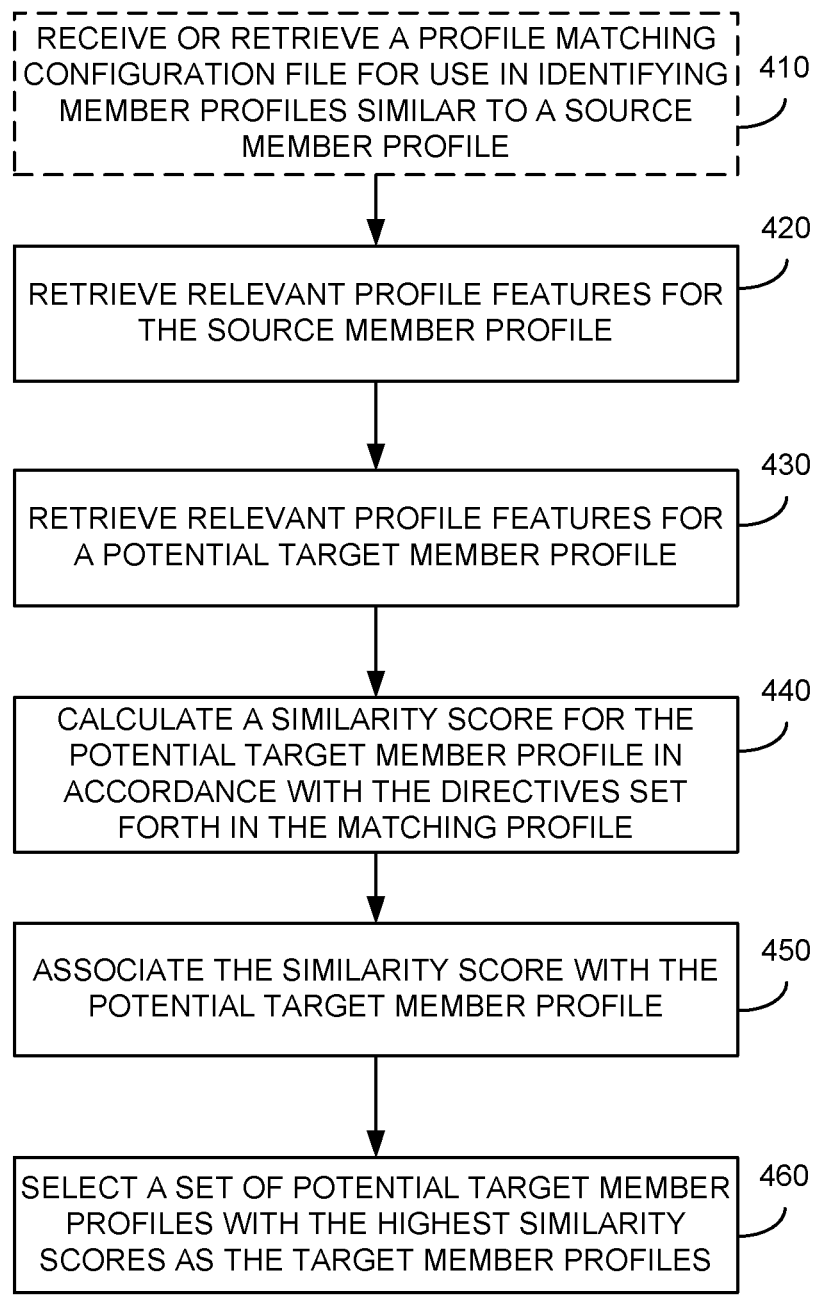
FIG. 4 is a flow diagram illustrating an example of the operations involved in a method of using a matching engine to generate similarity scores for potential target member profiles, according to an embodiment.

FIG. 4 is a flow diagram illustrating an example of the operations involved in a method 400 of using a matching engine to generate similarity scores for potential target member profiles, according to an embodiment. The method optionally begins at operation 410 when the recommendation engine receives, retrieves, or otherwise reads or processes a profile matching configuration file 232. The optional profile matching configuration file 232, which may be a document formatted in Extensible Mark-up Language (XML) or in some other format, specifies the particular features (e.g., data elements) that are to be extracted or retrieved from a particular recommendation entity, such as an enhanced member profile. For example, in assessing the similarity between any two member profiles, the names of the members may not play a role in determining the similarity of the profiles. As such, the optional profile matching configuration file 232 might not include member's names as a feature to be extracted and compared. However, technical skills or professional organizations may be relevant to the analysis, and as such, these features may be specified in the optional profile matching configuration file 232, such that the data representing these features may ultimately be retrieved and analyzed by the matching engine.

As discussed below, the optional profile matching configuration file 232 may specify the particular features to be retrieved as well as the particular matching algorithms to be used for each of the retrieved features. For example, the optional profile matching configuration file 232 may indicate the algorithm or comparison operations that are to be performed for the various profile features specified in the optional profile matching configuration file 232, and how the various similarity sub-scores, resulting from the comparison of individual profile features, are to be combined to generate an overall similarity score. The optional profile matching configuration file 232 may indicate that a particular comparison is to be performed for a particular profile feature, and that a match results only when there is an exact match, when there is a partial match, etc. The comparison may involve determining whether a particular profile feature is within a particular "distance" (e.g., similarity) of the same profile feature for the source member profile, etc. As such, the optional profile matching configuration file 232 may indicate not only the type of matching operation to be performed between a particular pair of profile features, but also the weight that should be applied to any resulting sub-score generated as a result of a match occurring between two profile features. The weight applied to any particular sub-score may be dependent upon the extent to which two features match, as may be specified by a matching algorithm or rule in the optional profile matching configuration file 232.

At method operation 420, the relevant member profile features for the source member profile are retrieved. The source member profile may be selected by a user, an application, or a process. The relevant member profile features for the source member profile may be those member profile features specified in the optional profile matching configuration file 232 optionally obtained at method operation 410. Each member profile may have an identifier (e.g., a member identifier or member profile identifier). Accordingly, a request to identify target member profiles similar to a source member profile may include an identifier identifying the source member profile. With this identifier, the matching engine may retrieve the necessary profile features from the pre-processed, enhanced source member profile for the particular member identified by the member identifier.

Next, at method operation 430, the matching engine may retrieve the same set of profile features for a potential target member profile—that is, a member profile to be compared with the source member profile. The potential target member profiles that are compared may be selected based on some required matching criteria, either by default, or as specified by an application, process, or user who has initiated the request. The matching analysis may operate on the entire set of member profiles, or may be limited to only those member profiles of members who share a particular feature in common, such as being employed by the same company, having attended the same school, having the same job title, etc.

At method operation 440, the matching engine may compare the various profile features and may calculate a similarity score for the potential target member profile, in accordance with the instructions or directives that may be set forth in the optional profile matching configuration file 232. The optional profile matching configuration file 232 may indicate which comparison operation(s) is/are to be performed for a pair of profile features and how the various similarity sub-scores are to be combined to derive the overall similarity score. Once the overall similarity score is determined for the potential target member profile, the similarity score may be associated with the potential target member profile at method operation 450, and the process, beginning with method operation 440, may be repeated for additional potential target member profiles, until all of a particular set of potential target member profiles have been assigned similarity scores.

Finally, at method operation 460, once each potential target member profile of the particular set of potential target member profiles has been assigned a similarity score indicating a level of similarity to the source member profile, a subset of the potential target member profiles with the highest similarity scores are selected as the target member profiles for use with the particular requesting application. If the target member profiles have been requested by a user of the social networking service, the target member profiles may be communicated to a client device of the user for presentation to the user—the target member profiles typically ordered based on their respective similarity scores. As an example of one of the many applications that might perform this type of member profile comparison, an example of a user interface displaying a source member profile and a list of target member profiles is presented in FIGS. 6 and 7.

The quantity of potential target member profiles that are selected as the target member profiles and provided for use with a requesting application may be determined using some default or predetermined number. Alternatively, the quantity of potential target member profiles that are selected as the target member profiles and provided to a particular requesting application may be configurable, so that a quantity of the potential target member profiles with the highest scores may be provided. For example, the optional profile matching configuration file 232 may specify the quantity of target member profiles that are to be returned to the requesting application. The quantity of member profiles may be specified explicitly (e.g., ten, thirty, one-hundred), or via a rule, such as the top "X" number of member profiles, all member profiles with a matching score exceeding "X," a combination thereof, etc.

Figure 5:
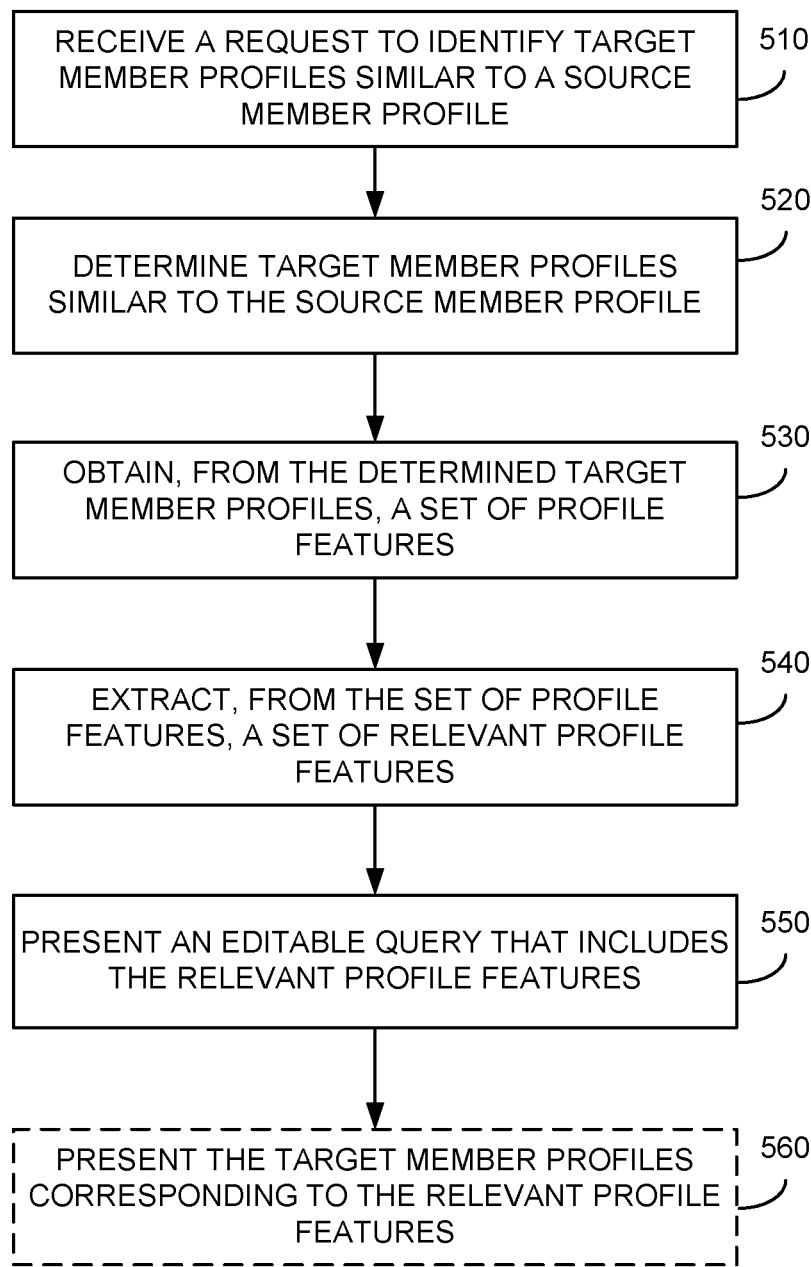
FIG. 5 is a flow diagram illustrating an example of the operations involved in a method of presenting a query to find target member profiles similar to a source member profile, according to an embodiment.

FIG. 5 is a flow diagram illustrating an example of the operations involved in a method 500 of presenting a query to find target member profiles similar to a source member profile, according to an embodiment. A request may be received to identify target member profiles similar to a source member profile (operation 510). The received request may be characterized as a request to generate an example query, for use in identifying target member profiles similar to the source member profile currently being viewed. In any case, the request may be received in response to a user selecting a user interface (e.g., application, web site, etc.) a button, a hyperlink, or some other user interface element presented in connection with a displayed source member profile.

A set of target member profiles that are similar to the source member profile may be determined (operation 520). For example, the set of target member profiles may be determined using method 400, as illustrated in FIG. 4 and described in the associated paragraphs.

A set of profile features may be obtained from the set of target member profiles determined to be similar to the source member profile (operation 530). The obtaining operation 530 may include inferring a profile feature for a target member profile in the set of target member profiles. For example, an inferred profile feature for a target member profile in the set of target member profiles may be the target member's age, seniority, reputation, job-seeking propensity, a skill not listed on the target member's profile, an influence score, etc.

An obtained profile feature may be a synonym of the actual profile feature. For instance, a synonym is a word, term, or phrase that is used interchangeably with another word, term, or phrase. For example, "software engineer" and "software developer" are often used interchangeably; thus, these terms may be synonyms.

A synonym may be a word, term, or phrase that is related to, but not interchangeable with, another word, term, or phrase. For example, assume a member profile in the set of similar member profiles has profile features describing the member as having worked as a "Web Developer" at Google, as graduating from Caltech with a Computer Science degree, and possessing JavaScript as a skill; in this example, profile feature synonyms for job titles may be "UI Developer" and "Front-End Developer," profile feature synonyms for companies may be "Facebook" and "LinkedIn," profile feature synonyms for skills may be "CSS," "HTML," and "Ajax," and profile feature synonyms for schools may be "Stanford,"

"UCLA," and "MIT." A synonym of a profile feature may be provided in an optional profile matching configuration file 232.

An obtained profile feature for a target member profile in the set of target member profiles may be stored for future use. For example, an obtained profile feature may be stored in a key-value store.

A set of relevant profile features may be extracted from the obtained set of profile features (operation 540). The extracting operation 540 may include identifying over-indexed profile features within the obtained set of profile features and adding the identified over-indexed profile features into the set of relevant profile features.

An editable query that includes the set of relevant profile features may be presented (operation 550) to the user. The editable query may be presented by presenting each relevant profile feature of the editable query as a text clause of the editable query. The presented editable query may be editable via text insertion or text deletion; for example, text may be inserted into the query, deleted from the query, or both.

Each profile feature may have a profile feature type. A profile feature may have a profile feature type of "Location," "Current Employer," "Previous Employer," "Education," "Job Title," "Skill," etc. The editable query may be presented by presenting each relevant profile feature as a clause in a textbox corresponding to its profile feature type. For example, assume a set of relevant profile features includes "Caltech" and "MIT" as having the profile feature type "Education," profile features "Google" and "Microsoft" as having the profile feature type "Current Employer," profile features "Java" and ".NET" as having the profile feature type "Skill," profile feature "Software Engineer" as having the profile feature type "Job Title," and profile feature "Palo Alto, Calif." as having the profile feature type "Location." In this example, the profile features "Caltech" and "MIT" are presented in a textbox associated with the "Education" profile feature type, the profile features "Google" and "Microsoft" are presented in a textbox associated with the "Current Employer" feature type, etc.

A set of target member profiles corresponding to the set of relevant profile features may optionally be presented (operation 560) in addition to the editable query being presented (operation 550). The set of target member profiles presented may be the same set of member profiles that would be presented upon execution of the initially presented editable query; thus, presenting the set of target member profiles along with the editable query may save a user the step of requesting to execute the query.

FIG. 6 illustrates an example of a user interface for requesting a query to find target member profiles similar to a source member profile, according to an embodiment. The user interface shown in FIG. 6, which may be representative of a web page, but may also be presented via another application (e.g., such as on a mobile device, phone or tablet device) illustrates an example of a source member profile for a source member named, "Joe Hansen." As illustrated in FIG. 6, on the left portion of the user interface, various profile features for the source member profile are presented. The profile features presented include the source member's current job title, industry, current company of employment, prior company of employment, etc. If a viewer (e.g., another member or non-member of the social networking service) of the source member profile would like to request a query to find target member profiles that are similar to the source member profile, the viewer may simply select the hyperlink or button 602 labelled, "Find Similar Profiles." Of course, the user interface element may have a different label, such as, "Generate a Query Based on this Profile." Upon selecting the hyperlink or button 602, a new user interface (e.g., web page) may be presented to the viewing user, such as that shown in FIG. 7.

Figure 7:
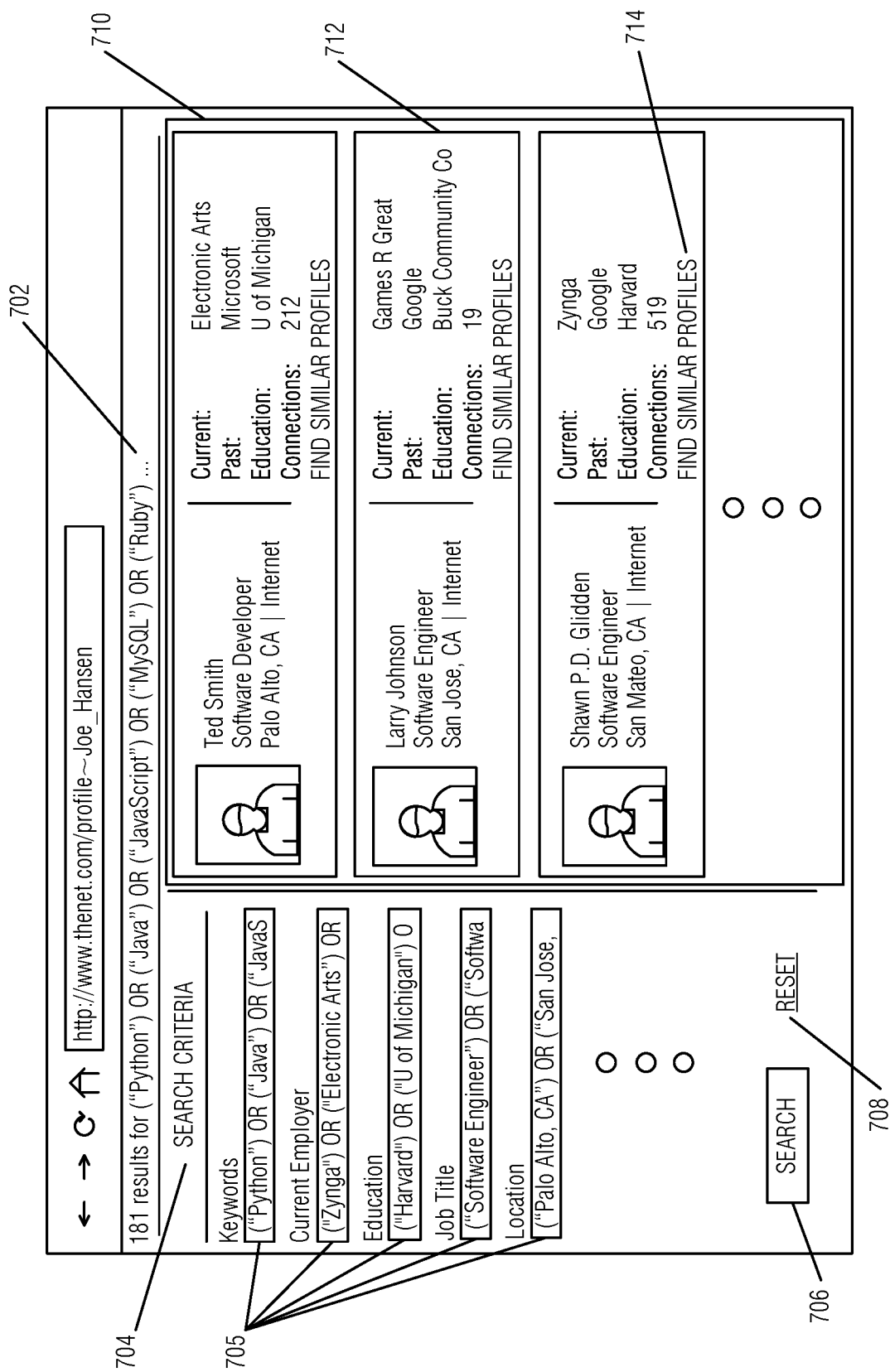
FIG. 7 illustrates an example of a user interface presenting a query for finding target member profiles similar to a source member profile, according to an embodiment.

FIG. 7 illustrates an example of a user interface presenting a query for finding target member profiles similar to a source member profile, according to an embodiment. As illustrated in FIG. 7, a new user interface may be presented to the viewer. The user interface may include an editable query to identify target member profiles similar to the source member profile. The editable query may be displayed as a compound statement 702 of its clauses. Each relevant profile feature of the editable query may be presented in the Search Criteria portion 704 of the user interface as a clause in a textbox 705 corresponding to its profile feature type. A user may be able to edit, modify, or update the clauses 705 of the editable query.

A user may be able to select a user interface element to cause the contents of the clause textboxes 705 to be combined into a new query, and for the query to be executed on the data of the electronic social network. The user interface element may be a search button 706 a search hyperlink, etc. The results of the query execution may be displayed in the search results portion 710 of the user interface.

The Search Criteria portion 704 of the user interface may include a reset hyperlink 708 or reset button which, when selected, may cause the clause textboxes 705 to be reset. Selecting the reset hyperlink 708 may cause the text in the clause textboxes 705 to be deleted, or may cause the text in the clause textboxes 705 to be set to the query that resulted in the list of member profiles 712 that are currently displayed in the search results portion 710 of the user interface.

The search results portion 710 of the user interface may include a list of target member profiles that have been determined to be similar to the source member profile. A target member profile 712 in the list may be an abbreviated profile (e.g., includes a strict subset of the profile features of the member profile). Each target member profile 712 in the list of target member profiles may include a "Find Similar Profiles" hyperlink or button 714. Upon a user selecting the "Find Similar Profiles" hyperlink or button 714 for a target member profile 712 in the list, the associated target member profile 712 may become the new source member profile, and the process for presenting a query to find target member profiles similar to the new source member profile may begin anew.

Continuing the example of FIG. 6, the search results portion 710 of the user interface includes a list of target member profiles that have been determined to be similar to Joe Hansen's member profile. The example user interface shows three target member profiles for members named "Ted Smith," "Larry Johnson," and "Shawn P. D. Glidden." Upon selecting any one of the three target member profiles, a more complete (e.g., full) target member profile for the selected target member profile may be displayed.

Filtering criteria (not shown) may be presented, allowing the viewer to filter the search results by various features. For example, the viewer may select only those target member profiles in the search results that indicate current employment at a particular company, or specific educational requirements (e.g., school attended), etc.

Figure 8:
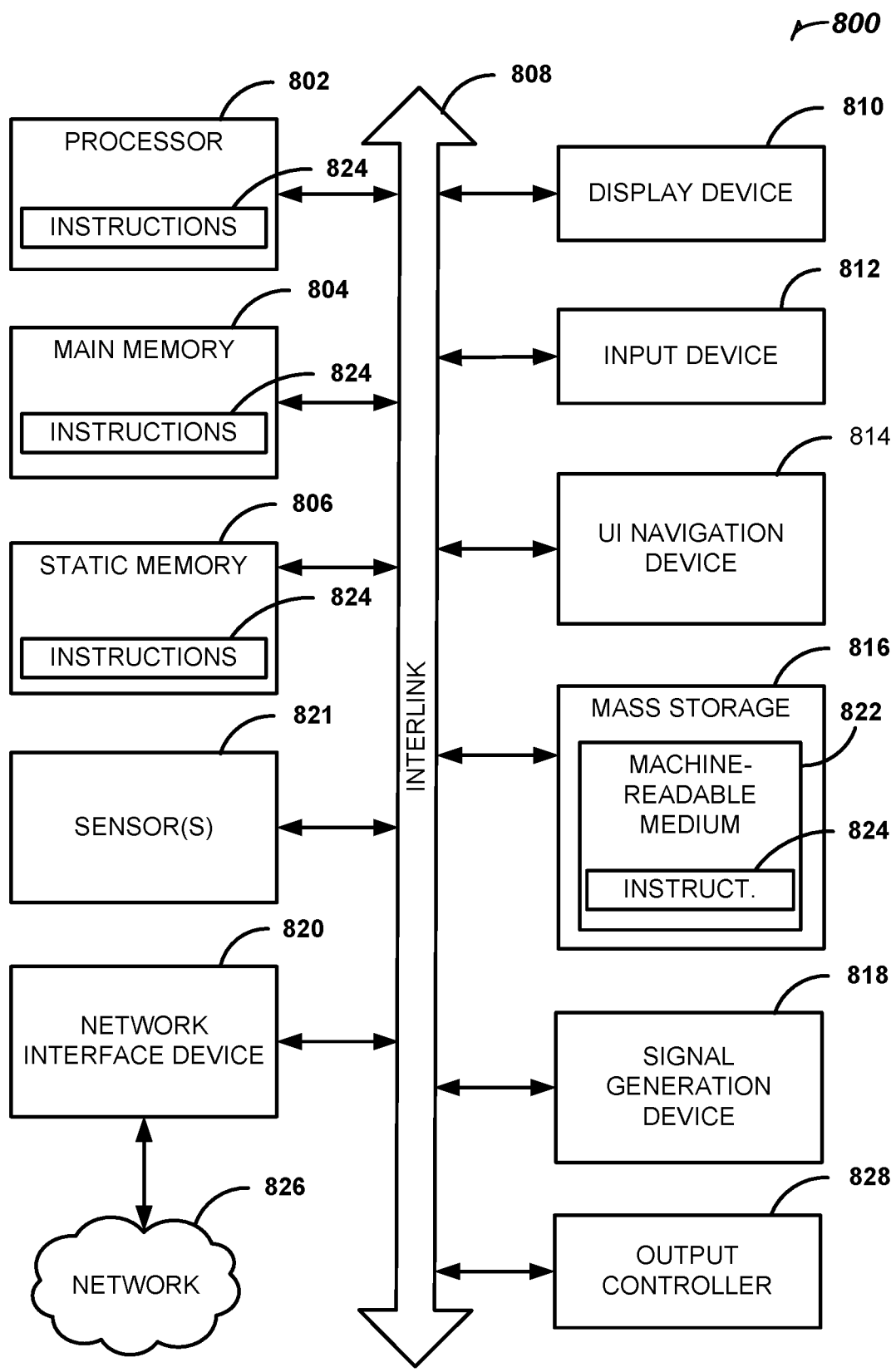
FIG. 8 is a block diagram illustrating an example of a machine, upon which any example embodiments may be implemented.

FIG. 8 is a block diagram illustrating an example of a machine 800, upon which any example embodiments may be implemented. In an embodiment, the machine 800 is connected (e.g., networked) to other machines. In a networked deployment, the machine 800 may operate in the capacity of a server machine, a client machine, or both a client machine and a server machine in server-client network environments. In an embodiment, the machine 800 acts as a peer machine in peer-to-peer (P2P) (or other distributed) network environment. In an embodiment, machine 800 is a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may perform, alone or in combination, specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the machine-readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display device 810, an input device 812 (e.g., buttons, switches, a keyboard, etc.), and a user interface (UI) navigation device 814 (e.g., a pointing stick, an isometric joystick or other isometric device, etc.). In an embodiment, the display device 810, input device 812, and UI navigation device 814 may be a touch screen display. The machine 800 may additionally include a storage device (e.g., drive unit) 816, a signal generation device 818 (e.g., a speaker), a network interface device 820, and a sensor 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine-readable medium 822, on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine-readable media.

Although the machine-readable medium 822 is illustrated as a single medium, the term "machine-readable medium" may include a single medium or multiple media (e.g., a centralized or distributed database, and/or associated caches and servers) arranged to store the one or more instructions 824.

The term "machine-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, IEEE 802.15.1 family of standards (known as Bluetooth®), peer-to-peer (P2P) networks, among others. In an embodiment, the network interface device 820 may include one or more physical jacks (e.g., Ethernet, coaxial, or phone jacks) and/or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800, and includes digital or analog communications signals or other intangible medium to facilitate communication of such software.

The various operations of the example methods described herein may be performed, at least partially, by one or more processors that are temporarily arranged (e.g., by software instructions) or permanently arranged to perform the relevant operations. Whether temporarily or permanently arranged, such processors may constitute processor-implemented modules or objects that operate to perform one or more operations or functions. The modules and objects referred to herein, in some example embodiments, may comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but also deployed across a number of machines or computers. In some example embodiments, the processor or processors may be located in a single location (e.g., within a home environment, an office environment, at a server farm, etc.), while in other embodiments, the processors may be distributed across a number of locations.

The one or more processors may also operate to support performance of the relevant operations in a "cloud computing" environment or within the context of software as a service (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Additional Notes

Example 1 is a computer-implemented method comprising: receiving a request to determine a first set of member profiles similar to a source member profile; determining the first set of member profiles similar to the source member profile, each member profile in the first set and the source member profile corresponding to respective members of an electronic social network; obtaining, from the first set of member profiles, a set of profile features; extracting, from the set of profile features, a set of relevant profile features; and presenting an editable query that includes the relevant profile features.

In Example 2, the subject matter of Example 1 optionally includes wherein determining the first set of member profiles comprises: determining, for a respective member profile in the first set of member profiles, a respective similarity score indicating a measure of similarity between the respective member profile and the source member profile, the respective similarity score determined by: retrieving a set of profile features from an enhanced member profile corresponding with a respective member profile, the enhanced member profile including profile features extracted from the member profile and enhanced profile features derived based on data in the member profile or retrieved from a data source external to the electronic social network; deriving a similarity sub-score for each profile feature in the set of profile features, a respective similarity sub-score for a respective profile feature indicating a measure of similarity between the respective profile feature and a corresponding profile feature from the source member profile; and combining the similarity sub-scores corresponding with each profile feature in the set of profile features to derive the respective similarity score for the respective member profile; and determining a quantity of member profiles having the highest similarity scores in relation to the source member profile.

In Example 3, the subject matter of Example 2 optionally includes wherein obtaining a set of profile features comprises: inferring, from at least one member profile within the first set of member profiles, a profile feature for a member profile.

In Example 4, the subject matter of any one or more of Examples 2-3 optionally include wherein a profile feature in the set of relevant profile features includes a synonym of the profile feature.

In Example 5, the subject matter of Example 4 optionally includes wherein a synonym of the profile feature is provided in a configuration file.

In Example 6, the subject matter of any one or more of Examples 1-5 optionally include presenting a set of target member profiles corresponding to an output of an execution of the presented editable query.

In Example 7, the subject matter of any one or more of Examples 1-6 optionally include wherein presenting the editable query includes presenting a relevant profile feature of the editable query as a text clause of the editable query; and wherein the editable query is editable by at least one of: text insertion and text deletion.

In Example 8, the subject matter of any one or more of Examples 1-7 optionally include wherein a profile feature has a profile feature type of Location, Company, Education, Job Title, Skill, or Seniority.

In Example 9, the subject matter of Example 8 optionally includes wherein presenting the editable query includes presenting a respective relevant profile feature in a graphical user interface (GUI) user control corresponding to the feature type of the respective relevant profile feature.

In Example 10, the subject matter of any one or more of Examples 1-9 optionally include wherein extracting includes: identifying over-indexed profile features from the set of profile features; and adding the identified over-indexed profiled features into the set of relevant profile features.

Example 11 is at least one machine-readable medium including instructions, which when executed by a machine, cause the machine to perform operations of any of the methods of Examples 1-10.

Example 12 is an apparatus comprising means for performing any of the methods of Examples 1-10.

Example 13 is at least one machine-readable medium including instructions which, when executed by a machine, cause the machine to: receive a request to determine a first set of member profiles similar to a source member profile; determine the first set of member profiles similar to the source member profile, each member profile in the first set and the source member profile corresponding to respective members of an electronic social network; obtain, from the first set of member profiles, a set of profile features; extract, from the set of profile features, a set of relevant profile features; and present an editable query that includes the relevant profile features.

In Example 14, the subject matter of Example 13 optionally includes wherein to determine the first set of member profiles includes to: determine, for a respective member profile in the first set of member profiles, a respective similarity score indicating a measure of similarity between the respective member profile and the source member profile, wherein to determine the respective similarity score includes to: retrieve a set of profile features from an enhanced member profile corresponding with a respective member profile, the enhanced member profile including profile features extracted from the member profile and enhanced profile features derived based on data in the member profile or retrieved from a data source external to the electronic social network; derive a similarity sub-score for each profile feature in the set of profile features, a respective similarity sub-score for a respective profile feature indicating a measure of similarity between the respective profile feature and a corresponding profile feature from the source member profile; and combine the similarity sub-scores corresponding with each profile feature in the set of profile features to derive the respective similarity score for the respective member profile; and determine a quantity of member profiles with the highest similarity scores in relation to the source member profile.

In Example 15, the subject matter of Example 14 optionally includes wherein to obtain a set of profile features includes to: infer, from at least one member profile within the first set of member profiles, a profile feature for a member profile.

In Example 16, the subject matter of any one or more of Examples 14-15 optionally include wherein a profile feature in the set of relevant profile features includes a synonym of the profile feature.

In Example 17, the subject matter of Example 16 optionally includes wherein a synonym of the profile feature is provided in a configuration file.

In Example 18, the subject matter of any one or more of Examples 13-17 optionally include wherein the instructions further cause the machine to: present a set of target member profiles corresponding to an output of an execution of the presented editable query.

In Example 19, the subject matter of any one or more of Examples 13-18 optionally include wherein to present the editable query includes to present a relevant profile feature of the editable query as a text clause of the editable query; and wherein the editable query is editable by at least one of: text insertion and text deletion.

In Example 20, the subject matter of any one or more of Examples 13-19 optionally include wherein a profile feature has a profile feature type of Location, Company, Education, Job Title, Skill, or Seniority.

In Example 21, the subject matter of Example 20 optionally includes wherein to present the editable query includes to present a respective relevant profile feature in a graphical user interface (GUI) user control corresponding to the feature type of the respective relevant profile feature.

In Example 22, the subject matter of any one or more of Examples 13-21 optionally include wherein to extract includes to: identify over-indexed profile features from the set of profile features; and add the identified over-indexed profiled features into the set of relevant profile features.

Example 23 is an electronic social network comprising: a machine-readable medium including machine-readable instructions which, when executed by a processor, cause the electronic social network system to: receive a request to determine a first set of member profiles similar to a source member profile; determine the first set of member profiles similar to the source member profile, each member profile in the first set and the source member profile corresponding to respective members of an electronic social network; obtain, from the first set of member profiles, a set of profile features; extract, from the set of profile features, a set of relevant profile features; and present an editable query that includes the relevant profile features.

In Example 24, the subject matter of Example 23 optionally includes wherein to determine the first set of member profiles includes to: determine, for a respective member profile in the first set of member profiles, a respective similarity score indicating a measure of similarity between the respective member profile and the source member profile, wherein to determine the respective similarity score includes to: retrieve a set of profile features from an enhanced member profile corresponding with a respective member profile, the enhanced member profile including profile features extracted from the member profile and enhanced profile features derived based on data in the member profile or retrieved from a data source external to the electronic social network; derive a similarity sub-score for each profile feature in the set of profile features, a respective similarity sub-score for a respective profile feature indicating a measure of similarity between the respective profile feature and a corresponding profile feature from the source member profile; and combine the similarity sub-scores corresponding with each profile feature in the set of profile features to derive the respective similarity score for the respective member profile; and determine a quantity of member profiles with the highest similarity scores in relation to the source member profile.

In Example 25, the subject matter of Example 24 optionally includes wherein to obtain a set of profile features includes to: infer, from at least one member profile within the first set of member profiles, a profile feature for a member profile.

In Example 26, the subject matter of any one or more of Examples 24-25 optionally include wherein a profile feature in the set of relevant profile features includes a synonym of the profile feature.

In Example 27, the subject matter of Example 26 optionally includes wherein a synonym of the profile feature is provided in a configuration file.

In Example 28, the subject matter of any one or more of Examples 23-27 optionally include wherein the instructions further cause the electronic social network to: present a set of target member profiles corresponding to an output of an execution of the presented editable query.

In Example 29, the subject matter of any one or more of Examples 23-28 optionally include wherein to present the editable query includes to present a relevant profile feature of the editable query as a text clause of the editable query; and wherein the editable query is editable by at least one of: text insertion and text deletion.

In Example 30, the subject matter of any one or more of Examples 23-29 optionally include wherein a profile feature has a profile feature type of Location, Company, Education, Job Title, Skill, or Seniority.

In Example 31, the subject matter of Example 30 optionally includes wherein to present the editable query includes to present a respective relevant profile feature in a graphical user interface (GUI) user control corresponding to the feature type of the respective relevant profile feature.

In Example 32, the subject matter of any one or more of Examples 23-31 optionally include wherein to extract includes to: identify over-indexed profile features from the set of profile features; and add the identified over-indexed profiled features into the set of relevant profile features.

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a machine-readable medium or machine-readable medium encoded with instructions operable to configure an electronic device to perform methods as described in the above examples. An implementation of such methods may include code, such as microcode, assembly language code, a higher-level language code, or the like. Such code may include machine-readable instructions for performing various methods. The code may form portions of computer program products. Further, in an example, the code may be tangibly stored on one or more volatile, non-transitory, or non-volatile tangible machine-readable media, such as during execution or at other times. Examples of these tangible machine-readable media may include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. A computer-implemented method comprising:
   performing operations for generating and presenting a user interface for editing a compound statement of a plurality of clauses of an editable query to find a first set of member profiles similar to a source member profile, the operations comprising:
   receiving a request to determine the first set of member profiles that are similar to the source member profile;
   determining the first set of member profiles that are similar to the source member profile, each of the first set of member profiles and the source member profile corresponding to respective members of an electronic social network;
   obtaining, from the first set of member profiles, a set of profile features;
   extracting, from the set of profile features, a set of relevant profile features, the extracting based on a determination of a usability of each of the set of relevant profile features to generate similarity scores indicating measures of similarity between the source member profile and each of the first set of member profiles;
   generating and presenting the user interface, the user interface including a search results portion and a search criteria portion, the search results portion including abbreviated profiles corresponding to the first set of member profiles, the search criteria portion including a plurality of separate user interface controls for separately editing the clauses, wherein the clauses correspond to the set of relevant profile features;
   receiving an edit of one of the clauses via one of the plurality of separate user interface controls;
   based on a selection of a selectable user interface element, updating the editable query such that it incorporates the edit of the one of the clauses into the compound statement of the plurality of clauses; and
   based on a selection of an additional selectable user interface element, updating the search results portion based on an executing the compound statement of the plurality of clauses of the editable search query.

2. The method of claim 1, wherein determining the first set of member profiles comprises:
   determining, for a respective member profile in the first set of member profiles, a respective similarity score indicating a measure of similarity between the respective member profile and the source member profile, the respective similarity score determined by:

retrieving a set of profile features from an enhanced member profile corresponding with a respective member profile, the enhanced member profile including profile features extracted from the member profile and enhanced profile features derived based on data in the member profile or retrieved from a data source external to the electronic social network;

deriving a similarity sub-score for each profile feature in the set of profile features, a respective similarity sub-score for a respective profile feature indicating a measure of similarity between the respective profile feature and a corresponding profile feature from the source member profile; and combining the similarity sub-scores corresponding with each profile feature in the set of profile features to derive the respective similarity score for the respective member profile; and determining a quantity of member profiles having the highest similarity scores in relation to the source member profile.

3. The method of claim 2, wherein obtaining a set of profile features comprises: inferring, from at least one member profile within the first set of member profiles, a profile feature for a member profile.

4. The method of claim 2, wherein a profile feature in the set of relevant profile features includes a synonym of the profile feature.

5. The method of claim 4, wherein a synonym of the profile feature is provided in a configuration file.

6. The method of claim 1, further comprising: presenting a set of target member profiles corresponding to an output of an execution of the editable query.

7. The method of claim 1, wherein the editable query and each of the editable text clauses is editable by at least one of: text insertion and text deletion.

8. The method of claim 1, wherein a profile feature has a profile feature type of Location, Company, Education, Job Title, Skill, or Seniority.

9. The method of claim 1, wherein extracting includes:
identifying over-indexed profile features from the set of profile features; and
adding the identified over-indexed profiled features into the set of relevant profile features.

10. At least one non-transitory machine-readable medium including instructions which, when executed by a machine, cause the machine to perform operations for generating and presenting a user interface for editing a compound statement of a plurality of clauses of an editable query to find a first set of member profiles similar to a source member profile, the operations comprising:

receiving a request to determine the first set of member profiles that are similar to the source ember profile;

determining the first set of member profiles that are similar to the source member profile; each of the first set of member profiles and the source member profile corresponding to respective members of an electronic social network;

obtaining, from the first set of member profiles, a set of profile features;

extracting, from the set of profile features; a set of relevant profile features, the extracting based on a determination of a usability of each of the set of relevant profile features to generate similarity scores indicating measures of similarity between the source member profile and each of the first set of member profiles;

generating and presenting the user interface, the user interface including a search results portion and a search criteria portion, the search results portion including abbreviated profiles corresponding to the first set of member profiles, the search criteria portion including a plurality of separate user interface controls for separately editing each of the clauses, wherein the clauses correspond to the relevant profile features;

receiving an edit of one of the clauses via one of the plurality of separate user interface controls;

based on a selection of a selectable user interface element, updating the editable query such that it incorporates the edit of the one of the clauses into the compound statement of the plurality of clauses; and based on a selection of an additional selectable user interface element, updating the search results portion based on an executing the compound statement of the plurality of clauses of the editable search query.

11. The at least one non-transitory machine-readable medium of claim 10, wherein the determine the first set of member profiles includes:

determining, for a respective member profile in the first set of member profiles, a respective similarity score indicating a measure of similarity between the respective member profile and the source member profile, wherein to determine the respective similarity score includes to:

retrieving a set of profile features from an enhanced member profile corresponding with a respective member profile, the enhanced member profile including profile features extracted from the member profile and enhanced profile features derived based on data in the member profile or retrieved from a data source external to the electronic social network;

deriving a similarity sub-score for each profile feature in the set of profile features, a respective similarity sub-score for a respective profile feature indicating a measure of similarity between the respective profile feature and a corresponding profile feature from the source member profile; and combining the similarity sub-scores corresponding with each profile feature in the set of profile features to derive the respective similarity score for the respective member profile; and determining a quantity of member profiles with the highest similarity scores in relation to the source member profile.

12. The at least one non-transitory machine-readable medium of claim 11, wherein the obtaining of the set of profile features includes inferring, from at least one member profile within the first set of member profiles, a profile feature for a member profile.

13. The at least one non-transitory machine-readable medium of claim 11, wherein a profile feature in the set of relevant profile features includes a synonym of the profile feature.

14. The at least one non-transitory machine-readable medium of claim 13, wherein a synonym of the profile feature is provided in a configuration file.

15. The at least one non-transitory machine-readable medium of claim 10, the operations further comprising: presenting a set of target member profiles corresponding to an output of an execution of the editable query.

16. The at least one non-transitory machine-readable medium of claim 10, wherein the editable query is editable by at least one of: text insertion and text deletion.

17. The at least one non-transitory machine-readable medium of claim 10, wherein a profile feature has a profile feature type of Location, Company, Education, Job Title, Skill, or Seniority.

18. The at least one non-transitory machine-readable medium of claim 10, wherein the extracting includes identifying over-indexed profile features from the set of profile features and adding the identified over-indexed profiled features into the set of relevant profile features.

19. An electronic social network comprising:
a non-transitory machine-readable medium including machine-readable instructions which, when executed by one or more processors, cause an electronic social network to perform operations for generating and presenting a user interface for editing a compound statement of a plurality of clauses of an editable query to find a first set of member profiles similar to a source member profile, the operations comprising:
receiving a request to determine the first set of member profiles that are similar to the source member profile;
determining the first set of member profiles that are similar to the source member profile, each of the first set of member profiles and the source member profile corresponding to respective members of an electronic social network;
obtaining, from the first set of member profiles, a set of profile features;
extracting, from the set of profile features, a set of relevant profile features, the extracting based on a determination of a usability of each of the set of relevant profile features to generate similarity scores indicating measures of similarity between the source member profile and each of the first set of member profiles;
generating and presenting the user interface, the user interface including a search results portion and a search criteria portion, the search results portion including abbreviated profiles corresponding to the first set of member profiles, the search criteria portion including a plurality of separate user interface controls for separately editing each of the clauses, wherein the clauses correspond to the relevant profile features;
receiving an edit of one of the clauses via one of the plurality of separate user interface controls;
based on a selection of a selectable user interface element, updating the editable query such that it incorporates the edit of the one of the clauses into the compound statement of the plurality of clauses; and
based on a selection of an additional selectable user interface element, updating the search results portion based on an executing the compound statement of the plurality of clauses of the editable search query.

20. The electronic social network of claim 19, wherein the determining of the first set of member profiles includes:
determining, for a respective member profile in the first set of member profiles, a respective similarity score indicating a measure of similarity between the respective member profile and the source member profile, wherein to determine the respective similarity score includes to:
retrieving a set of profile features from an enhanced member profile corresponding with a respective member profile, the enhanced member profile including profile features extracted from the member profile and enhanced profile features derived based on data in the member profile or retrieved from a data source external to the electronic social network;
deriving a similarity sub-score for each profile feature in the set of profile features, a respective similarity sub-score for a respective profile feature indicating a measure of similarity between the respective profile feature and a corresponding profile feature from the source member profile; and
combining the similarity sub-scores corresponding with each profile feature in the set of profile features to derive the respective similarity score for the respective member profile; and
determining a quantity of member profiles with the highest similarity scores in relation to the source member profile.

21. The electronic social network of claim 20, wherein the obtaining of the set of profile features includes inferring, from at least one member profile within the first set of member profiles, a profile feature for a member profile.

22. The electronic social network of claim 20, wherein a profile feature in the set of relevant profile features includes a synonym of the profile feature.

23. The electronic social network of claim 22, wherein a synonym of the profile feature is provided in a configuration file.

* * * * *

UNITED STATES PATENT AND TRADEMARK OFFICE
CERTIFICATE OF CORRECTION

PATENT NO. : 10,698,914 B2  
APPLICATION NO. : 15/085516  
DATED : June 30, 2020  
INVENTOR(S) : Qiao et al.

Page 1 of 1

It is certified that error appears in the above-identified patent and that said Letters Patent is hereby corrected as shown below:

On the Title Page

In Column 2, Item (56) under "Other Publications", Line 1, delete "Black." and insert --Black-- therefor In the Claims In Column 21, Line 55, in Claim 10, delete "profile;" and insert --profile,-- therefor In Column 21, Line 61, in Claim 10, delete "features;" and insert --features,-- therefor Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*